(12) United States Patent
Wenzel et al.

(10) Patent No.: US 9,358,868 B2
(45) Date of Patent: Jun. 7, 2016

(54) HYBRID DRIVETRAIN AND METHOD FOR CONTROLLING THE SAME

(71) Applicant: GETRAG Getriebe- und Zahnradfabrik Hermann Hagenmeyer GmbH & Cie KG, Untergruppenbach (DE)

(72) Inventors: Sören Wenzel, Schefflenz (DE); Stevens Sehic, Tamm (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 34 days.

(21) Appl. No.: 14/227,179

(22) Filed: Mar. 27, 2014

(65) Prior Publication Data

US 2014/0296026 A1   Oct. 2, 2014

(30) Foreign Application Priority Data

Mar. 27, 2013   (DE) .......................... 10 2013 005 252

(51) Int. Cl.
*B60K 6/547* (2007.10)
*B60K 6/36* (2007.10)
*B60K 6/48* (2007.10)
(Continued)

(52) U.S. Cl.
CPC ... *B60K 6/36* (2013.01); *B60K 6/48* (2013.01); *B60K 6/547* (2013.01); *B60W 10/02* (2013.01); *B60W 10/06* (2013.01); *B60W 10/11* (2013.01); *B60W 20/10* (2013.01); *B60W 30/1882* (2013.01); *B60K 2006/4841* (2013.01);
(Continued)

(58) Field of Classification Search
CPC .......... B60K 6/547; B60K 2006/4841; B60W 40/1005
See application file for complete search history.

(56) References Cited

U.S. PATENT DOCUMENTS 5,453,930 A * 9/1995 Imaseki et al. .................. 701/22
6,554,088 B2 * 4/2003 Severinsky et al. ........ 180/65.23
(Continued)

FOREIGN PATENT DOCUMENTS

AT          508065 A2   10/2010
CN       201777113 U    3/2011
(Continued)

OTHER PUBLICATIONS

European Partial Search Report, dated Aug. 28, 2014, 7 pages.
(Continued)

*Primary Examiner* — Sherry Estremsky
(74) *Attorney, Agent, or Firm* — Reising Ethington P.C.

(57) ABSTRACT

A hybrid drivetrain for a motor vehicle has a first drive unit which has a first drive device by means of which first drive power can be provided. A second drive unit has a second drive device by means of which second drive power can be provided. A drive output device can be connected to driven wheels of the motor vehicle. A first gearbox arrangement has a first gearbox input and a first gearbox output. A second gearbox arrangement has a second gearbox input and a second gearbox output. The first drive device is connected to the first gearbox input and the second drive device is connected to the second gearbox input. The first and second gearbox outputs are connected to the drive output device. The first and second gearbox inputs can be connected to one another or separated from one another by means of a clutch.

23 Claims, 5 Drawing Sheets

(51) Int. Cl.
*B60W 10/02* (2006.01)
*B60W 10/06* (2006.01)
*B60W 10/11* (2012.01)
*B60W 30/188* (2012.01)
*B60W 20/00* (2016.01)

(52) U.S. Cl.
CPC .......... *Y02T10/6221* (2013.01); *Y10S 903/902* (2013.01); *Y10T 477/26* (2015.01)

(56) References Cited

U.S. PATENT DOCUMENTS

| | | | |
|---|---|---|---|
| 6,634,247 | B2 | 10/2003 | Pels et al. |
| 7,249,537 | B2 * | 7/2007 | Lee et al. .................. 74/661 |
| 7,464,616 | B2 | 12/2008 | Leibbrandt et al. |
| 7,625,311 | B2 * | 12/2009 | Dilzer ......................... 477/5 |
| 8,050,830 | B2 * | 11/2011 | Komeda et al. ............. 701/51 |
| 8,257,221 | B2 * | 9/2012 | Leufgen ...................... 477/3 |
| 8,795,115 | B2 * | 8/2014 | Puiu ........................... 475/5 |
| 8,960,033 | B2 * | 2/2015 | Kaltenbach et al. ......... 74/331 |
| 8,978,516 | B2 * | 3/2015 | Funk et al. ............... 74/665 A |
| 2005/0101432 | A1 * | 5/2005 | Pels et al. .................... 477/5 |
| 2008/0248910 | A1 * | 10/2008 | Turvey ........................ 475/91 |
| 2011/0239819 | A1 * | 10/2011 | Shibahata ............... 74/665 A |
| 2011/0239820 | A1 * | 10/2011 | Shibahata ............... 74/665 L |
| 2013/0109530 | A1 * | 5/2013 | Kaltenbach et al. ............ 477/5 |
| 2013/0186233 | A1 * | 7/2013 | Kaltenbach ................. 74/661 |
| 2013/0296099 | A1 | 11/2013 | Funk et al. |
| 2014/0000412 | A1 | 1/2014 | Kaltenbach |
| 2015/0046010 | A1 * | 2/2015 | Wakashiro et al. ........... 701/22 |

FOREIGN PATENT DOCUMENTS

| | | | |
|---|---|---|---|
| DE | 10133695 | A1 | 3/2002 |
| DE | 10203514 | A1 | 8/2003 |
| DE | 69922221 | T2 | 3/2006 |
| DE | 10 2010 063 092 | * | 6/2011 |
| DE | 102011005561 | A1 | 9/2012 |
| EP | 2368739 | A1 | 9/2011 |
| EP | 2368739 | A4 | 6/2013 |
| WO | WO2012079683 | A2 | 6/2012 |

OTHER PUBLICATIONS

German Examination Report dated Dec. 18, 2013, 6 pages.
Chinese Office Action for Application No. 201410117200.5 dated Jan. 15, 2016, 7 pages.
English Translation of Chinese Office Action for Application No. 201410117200.5 dated Jan. 15, 2016, 9 pages.

* cited by examiner

US 9,358,868 B2

HYBRID DRIVETRAIN AND METHOD FOR CONTROLLING THE SAME

CROSS REFERENCES TO RELATED APPLICATIONS

This application claims the priority of German patent application DE 10 2013 005 252.1, filed Mar. 27, 2013, which is incorporated herein by reference.

BACKGROUND OF THE INVENTION

The present invention relates to a hybrid drivetrain for a motor vehicle, having a first drive unit which has a first drive device by means of which first drive power can be provided, having a second drive unit which has a second drive device by means of which second drive power can be provided, having a drive output device which can be connected to driven wheels of the motor vehicle, having a first gearbox arrangement which has a first gearbox input and a first gearbox output, having a second gearbox arrangement which has a second gearbox input and a second gearbox output, wherein the first drive device is connected to the first gearbox input and wherein the second drive device is connected to the second gearbox input, and wherein the first and the second gearbox output are connected to the drive output device.

A hybrid drivetrain of said type is known from document WO 2012/079683 A2.

In the field of hybrid drivetrains, it is known for a drive unit in the form of an internal combustion engine to be assigned a further drive unit in the form of an electric machine. Here, the electric machine is generally of considerably lower power than the internal combustion engine. In some embodiments, the electric machine can provide drive power for purely electric driving, wherein purely electric driving operation is restricted owing to the electrical energy store that must be provided. A compromise must generally be found here, because a large electrical energy store leads to a high vehicle weight. A small electrical energy store leads to a short electric travelling range. In many cases, the electric travelling range is only a few kilometres. The electric machine can however also be used for other operating modes, for example for a boost mode, for the starting of the internal combustion engine, or for the charging of the electrical energy store (in a recuperation operating mode).

Such hybrid drive concepts do not fully exploit the possibilities of electric machines as a drive. This is because electric machines have the advantage, as a drive motor, that they can provide a high torque even at low rotational speeds, and in many operating modes exhibit greater efficiency than the internal combustion engine.

Furthermore, in the field of hybrid drivetrains, so-called "range extender concepts" are known. The basic idea of said concepts consists in at least predominantly using an electric machine for driving the motor vehicle. Furthermore, such concepts generally have a second electric machine which is designed for charging the electrical energy store and which is connected or connectable to the internal combustion engine. A typical operating state in the case of such range extender concepts consists in the internal combustion engine being kept in a rotational speed range that is expedient in terms of efficiency and hereby charging the electrical energy store by means of the second electric machine. In parallel with this, power from the electrical energy store is used for the first electric machine, which drives the vehicle. In some embodiments, the internal combustion engine may in this case be used to assist in providing drive, though this increases the complexity of such range extender concepts.

Known range extender concepts also have a gearbox arrangement. Here, it is for example known for the gearbox to be equipped with a single fixed transmission ratio. Since the electric machine that acts as a drive motor can operate over a large rotational speed range, a gearbox arrangement of said type may be adequate. In other gearbox arrangements, multiple gear stages may be provided. It is for example known for the gearbox arrangement to be in the form of a powershift-capable two-gear gearbox.

A disadvantage of some range extender concepts is that, in the case of a driving profile in which the vehicle is driven initially in an urban area, then over a relatively long distance, and then in the urban area again, purely electric driving is initially possible with the battery in the urban area, but then the battery is discharged relatively quickly during electric driving over the relatively long distance, such that a switch must be made to internal combustion engine operation. In this case, purely electric driving is then no longer possible in the urban traffic at the destination, because the battery has been discharged.

Furthermore, many hybrid drive concepts are afflicted by the fact that the acceleration by means of the internal combustion engine and the recuperation by means of the electric machine entail a very poor efficiency chain.

Furthermore, in many hybrid drivetrain concepts, provision is made for the electric machine to be used over as broad an operating range as possible. This then consequently often leads to large battery sizes; this in turn leads to a high weight, with the consequential result of low acceleration capability of the motor vehicle, specifically in the lower speed range.

The document WO 2012/079683 A2 mentioned in the introduction discloses a hybrid drivetrain which has a single electric machine and a single internal combustion engine. The drive device of the electric machine is connected to a gearbox output via a two-gear gearbox. The internal combustion engine is connected to a gearbox output via a three-gear gearbox, wherein the gearbox outputs are formed by a common output shaft which is connected to a differential. In the case of said drive concept, the two gearbox arrangements can be shifted independently of one another, and the rotational speeds of the internal combustion engine and of the electric machine can be selected independently of one another within the scope of the available gears.

It is also provided that the peak power of the electric motor amounts to at least 30%, in particular at least 100% of the rated power of the internal combustion engine. It is considered to be particularly preferable for the continuous power output of the electric motor to amount to approximately 80% of the rated power of the internal combustion engine or higher.

The intention of this is to make it possible to realize a fully-fledged driving function with the electric motor. In particular, it is provided here that the three-stage gearbox arrangement which is connected to the internal combustion engine has a first gear stage in the form of a starting gear stage, a second gear stage in the form of a maximum speed gear stage, and a third gear stage as an efficiency gear stage. The two-gear gearbox arrangement which is connected to the electric machine is intended to have a first gear stage as a dynamic gear stage with short transmission ratio, and a second gear stage as a maximum speed gear stage.

In one variant, provision is made for the output shaft of the electric machine and the output shaft of the internal combustion engine to be connected to one another by means of an intermediate shaft in order to permit standstill charging. In a third variant, provision is made for a first gear stage, which is configured as a starting and low gear, of the internal combustion engine to be realized through joint use of the sub-gearbox provided for the electric motor.

SUMMARY OF THE INVENTION

Against this background, it is an object of the invention to specify an improved hybrid drivetrain and improved methods for operating a hybrid drivetrain.

The object is achieved by means of a hybrid drivetrain of the type mentioned in the introduction, wherein the first and the second gearbox input can be connected to one another or separated from one another by means of a clutch.

With the hybrid drivetrain according to the invention, it is possible for at least one of the following advantages to be obtained. Firstly, the drivetrain can be realized with only one electric machine. The travelling range of the drivetrain can be increased without enlarging the battery. In the ideal case, it is even possible to use a smaller battery than in the prior art. Losses in the gearbox arrangements can be minimized. The drivetrain can be realized with a small structural size. During shift processes in one gearbox arrangement, drive power can be transmitted via the other gearbox arrangement in order to avoid interruptions in traction power, such that comfort is increased. At least one of the drive units can, when the clutch is closed, use not only the gear stages of the gearbox arrangement assigned to said drive unit but also the gear stages of the other gearbox arrangement. This applies in particular to the internal combustion engine, which can preferably use all of the gear stages of both gearbox arrangements.

Furthermore, standstill charging can be realized in a relatively simple manner. Furthermore, a high level of efficiency is achieved overall. It is also possible for a boost mode to be realized in which the drive power of the first and of the second drive unit are combined. The drivetrain can be driven by means of only the first drive unit or by means of only the second drive unit.

The first drive unit preferably has an electric machine. The second drive unit preferably has an internal combustion engine. The drive devices of the drive unit may be shafts such as a crankshaft of an internal combustion engine or a motor shaft of an electric machine. The drive devices may however also have gear sets by means of which a first transmission ratio adaptation to the respective gearbox input is realized.

The gearbox arrangements are preferably realized in the form of spur-gear gearboxes. The drive output device may comprise a drive output gear set or gear sets and a mechanical differential. The drive output device may furthermore comprise a power-split facility for a four-wheel drive system.

The clutch may be realized in the form of a jaw clutch. The clutch may however also be realized in the form of a synchromesh shift clutch. It is alternatively possible for the clutch to be realized as a friction clutch which can also be operated in a slipping state, for example a wet-running multiplate clutch or a dry-running friction clutch.

The drivetrain may be configured for front-transverse installation in a motor vehicle, though may also be configured for a longitudinal type of construction.

The electric machine can provide electric motor drive power. It is however preferably also possible for the electric machine to be operated in a generator mode in order to charge an electrical energy store.

The object is thereby achieved in its entirety.

In one particularly preferred embodiment, the first gearbox arrangement has at least one first selectable gear stage.

In the present case, a selectable gear stage is to be understood to mean that the gear stage can be engaged and disengaged, that is to say the associated gearbox arrangement can also be placed into a neutral state. The first gearbox arrangement preferably has two or fewer gear stages.

In one particularly preferred embodiment, the first selectable gear stage of the first gearbox arrangement is a starting gear stage of the drivetrain.

With the clutch closed, drive power can, for starting, be transmitted from the first drive unit and from the second drive unit via the starting gear stage.

It is generally possible for none of the gearbox arrangements to have a reverse gear stage realized by means of a gear set. In this case, reverse travel is realized exclusively by means of the electric machine, which can also be driven in a reverse direction of rotation.

It is however particularly preferable for the first gearbox arrangement to have a reverse gear stage. In this case, it is possible for reverse travel to be established by means of the first drive unit. It is preferably also possible for reverse travel to be established by means of the second drive unit or by means of both drive units.

Furthermore, it is altogether advantageous for the second gearbox arrangement to have at least two selectable gear stages.

In this way, it is also possible for internal combustion engine operation to be realized over a large speed range.

It is particularly advantageous for the transmission ratio or transmission ratios that can be established by the first gearbox arrangement and the transmission ratio or transmission ratios that can be established by the second gearbox arrangement to be different.

In this way, it is possible to realize a broader spread. This is the case in particular if, for example, the second drive unit can use transmission ratios both of the first gearbox arrangement and also of the second gearbox arrangement.

It is particularly preferable for the transmission ratios that can be established by the two gearbox arrangements to be complementary, wherein the first gearbox arrangement preferably comprises a first gear stage in the form of a starting gear stage, wherein the second gearbox arrangement preferably comprises a second gear stage. Furthermore, it is preferably possible for the first gearbox arrangement to have a second or a third gear stage, and for the second gearbox arrangement to also have a third gear stage instead of a second. Furthermore, the second gearbox arrangement may have a fourth gear stage.

It is preferable for the overall number of transmission ratios for forward travel that can be established by means of the first and second gearbox arrangements to be less than or equal to 4, in particular less than or equal to 3.

In a further altogether advantageous embodiment, the first drive unit has precisely one electric machine, wherein the second drive unit has an internal combustion engine and no electric machine.

In this embodiment, the drivetrain preferably has exactly two drive units, specifically an electric machine of the first drive unit and an internal combustion engine of the second drive unit. Since, in the case of this drivetrain, there is in particular no need for a second electric machine, the overall weight of the drivetrain can be reduced considerably.

It is furthermore advantageous for the drivetrain to have an electrical energy store for an electric machine, the capacity of which electrical energy store is less than 20 kWh, in particular less than 15 kWh and preferably less than 10 kWh.

In the case of a drivetrain of the type according to the invention, it is possible, in particular in the implementation of a method according to the invention, such as will be described below, for use to be made of an energy store which is of such a small size that the overall weight of the motor vehicle can be reduced considerably.

The electrical energy store is preferably a lithium-based energy store, such as a lithium-ion energy store, or a similar energy store with a high power density.

The first and second drive units may be of equal power. The maximum power of the second drive unit may be higher than that of the first drive unit.

It is however particularly preferable, even for a situation in which the first and second gearbox inputs cannot be connected to one another or separated from one another by means of a clutch, for the first drive unit to have an electric machine which has a first maximum power, wherein the second drive unit has an internal combustion engine which has a second maximum power, wherein the first maximum power is greater than the second maximum power, in particular is greater than 1.5 times the second maximum power, and preferably is greater than 2.5 times the second maximum power, and is particularly preferably greater than 5 times the second maximum power.

In preferred variants, the first maximum power of the electric machine may be greater than 8 times the second maximum power.

In this embodiment, use is made of an electric machine which is relatively powerful in relation to the internal combustion engine, which is particularly preferable in particular in conjunction with the methods according to the invention that will be described below.

By means of such a relatively powerful electric machine, it is possible to obtain relatively high levels of acceleration with high efficiency, which is not possible with internal combustion engines of similar power. In the case of a drivetrain of said type, the internal combustion engine is preferably used for steady-state operation, in particular at relatively high speeds. By contrast, the electric machine is preferentially used at relatively low speeds, at which frequent acceleration and braking is required, such as is the case for example in urban traffic.

In a first preferred embodiment, the second drive device is fixedly connected to the second gearbox input. In this embodiment, the drivetrain can be realized in compact form and with few complex assemblies. If the second drive unit is realized by means of an internal combustion engine, it is consequently the case that the crankshaft is fixedly connected to the second gearbox input. A fixed connection is to be understood to mean both a coaxial connection of a shaft of the second drive device to a shaft of the second gearbox input but also a connection by means of a non-shiftable gear set arrangement, in particular in the form of a spur gear set arrangement.

In an alternative embodiment, the second drive device is connected to the second gearbox input via a further clutch.

In this variant, the second drive unit can be decoupled from the rest of the drivetrain by means of the further clutch. This makes it possible for the first drive unit to use not only the gear stages of the associated first gearbox arrangement but also gear stages of the second gearbox arrangement, because in this case, the second drive unit, which preferably has an internal combustion engine, does not have to also be driven along.

In this variant, it is preferable if, upon the closure of the first clutch, the further clutch is also closed.

The drive units are preferably arranged such that the drive shafts thereof are oriented parallel to one another. In this way, it is possible to realize a simple connection to a spur-gear gearbox.

The drive units preferably each have gear stages which are formed by a loose gear and a fixed gear, wherein the loose gear can be connected to an associated shaft by means of an associated shift clutch, wherein the shift clutch may be in the form of a jaw clutch or a synchromesh shift clutch.

In this variant, the gearbox arrangements preferably have in each case only one gearbox input shaft and one gearbox output shaft. Here, a drive shaft of the second drive device is preferably oriented coaxially with respect to a gearbox input shaft. The connection to the gearbox input shaft may in this case be fixed, as described above, though may also include a torsion damper or the like.

The loose gears of the gearwheel sets may be arranged on the gearbox input shaft. In this case, the associated shift clutches are also arranged on the gearbox input shaft. The loose gears and shift clutches may however also be arranged on the respective gearbox output shaft.

The electric machine may be arranged so as to be parallel and offset with respect to a crankshaft of the internal combustion engine. In a preferred variant, the electric machine is arranged coaxially with respect to a crankshaft of the internal combustion engine.

In this case, it is preferable for the first drive device to have a hollow shaft, wherein the second drive device has an inner shaft which extends through the hollow shaft.

In this embodiment, a rotor of the electric machine is preferably connected to the hollow shaft, and the inner shaft is preferably connected to the internal combustion engine fixedly or via a further clutch.

In this case, a gearbox input shaft of the first gearbox arrangement is preferably likewise in the form of a hollow shaft, which is fixedly connected to the hollow shaft of the first drive device. In this case, one or more gears of gearwheel sets of the first gearbox arrangement may be mounted on said hollow shaft arrangement. A gearbox input shaft of the second gearbox arrangement is in this case preferably likewise in the form of an inner shaft, which is fixedly connected to the inner shaft of the second drive device and which extends through the hollow shaft of the first gearbox arrangement.

In this variant, it is possible to realize an, in particular, radially compact construction. In this variant of a hybrid drivetrain, it is furthermore preferable for the first clutch to be arranged between the first and the second drive unit in the axial direction. The same applies to the further clutch, if one is provided.

In an alternative variant, a gearbox input shaft of the first gearbox arrangement and a gearbox input shaft of the second gearbox arrangement are in the form of solid shafts which are arranged coaxially with respect to one another and which point toward one another, wherein the clutch is arranged between said shafts in the axial direction.

In both variants, the first drive device may have a drive gear which is connected to a driveshaft of the first drive unit and which meshes fixedly with a further gear, in particular a gear of the first gearbox arrangement, specifically preferably with the gear assigned to the first selectable gear stage.

Furthermore, in both variants, it is possible for the first and the second gearbox output to have a common output shaft.

In other words, the first and the second gearbox output, which are preferably situated adjacent to one another in the axial direction, may be fixedly connected to one another so as to form a common output shaft, the latter being connected to the drive output device.

The above-described drivetrain according to the invention can be advantageously controlled in a variety of ways such that the drivetrain requires only a relatively small electrical energy store, wherein it is nevertheless possible to achieve a large travelling range. Some of the methods according to the invention described below are applicable even in the case of the first and the second gearbox inputs being connected to one another not by means of a clutch but rather in a fixed manner.

A first method according to the invention for controlling a drivetrain comprises the following steps: controlling the second drive unit, in a first operating mode during travel, such that, at least above a first threshold value of the speed of the motor vehicle, the second drive unit provides a level of drive power that corresponds to the rolling resistance of the vehicle and the air resistance of the vehicle at the respective speed.

The running resistance of a motor vehicle generally includes the rolling resistance, the air resistance and an acceleration resistance and a gradient resistance. The sum of said resistances must be compensated by means of drive power during travel.

The basic idea of this aspect of a method according to the invention consequently includes the use of the second drive unit, which preferably has the internal combustion engine, substantially for compensating the rolling resistance and the air resistance of the vehicle. The air resistance in particular exhibits a highly pronounced (quadratic) dependency on the speed of the vehicle. Accordingly, at relatively high speed, the second drive unit generally provides a relatively high level of drive power to compensate said resistances. The rolling resistance and the air resistance are in this case substantially constant during steady-state operation of the vehicle. Therefore, by means of a suitable transmission ratio, the second drive unit can preferably be operated at an operating point which is optimal with regard to efficiency, in particular if said resistance compensation is performed only above a first threshold value of the speed of the motor vehicle, which may be for example in the range from 60 to 100 km/h, in particular in the range from 70 to 90 km/h.

In speed ranges lower than this, it is firstly the case that the motor vehicle is only seldomly in steady-state driving operation, because frequent acceleration and braking is required, such as is the case for example in urban traffic. Secondly, the relative influence of rolling resistance and air resistance is considerably lower in the lower speed range.

In steady-state operation above the first speed threshold value, the first drive unit (in particular an electric machine) can consequently be shut down for a relatively long period of time, such that the electrical energy store is not constantly subject to load.

Here, depending on the state of charge, the internal combustion engine may provide additional drive power not only for the rolling and air resistance but also for operating the electric machine in the generator mode (recuperation power). Consequently, during steady-state driving operation, the electrical energy store can always be kept in a fully charged state, such that drive power from the first drive unit can be drawn upon preferably at any time.

According to a further aspect of a control method according to the invention, the first drive unit has an electric machine, the method having the following steps: controlling the first drive unit, in a first operating mode during travel, such that, above a first threshold value of the speed of the motor vehicle, the first drive unit provides a level of motor drive power required for a demanded positive acceleration, and/or provides, in a generator mode, at least a part of a level of braking power required for a demanded negative acceleration.

Consequently, if a demand for acceleration is made by the driver during a period of steady-state travel in which the drive power is provided substantially by the second drive unit, said demand for acceleration is met through the provision of drive power by means of the first drive unit in the form of an electric machine. Furthermore, in the event of negative acceleration demands, the required braking power can be provided at least in part by virtue of the electric machine operating recuperatively in the generator mode.

Since, in the case of this aspect of a method according to the invention, the drive power required for positive accelerations is in particular provided by the electric machine, the second drive unit (which preferably has the internal combustion engine) can be of relatively small dimensions. This is because, at least in a medium speed range (above the first speed threshold value and considerably below a maximum speed of the vehicle), the acceleration resistance may be considerably higher than the sum of rolling resistance and air resistance. Accordingly, it is justified for the electric machine to be realized with a relatively high maximum power which is considerably higher than the maximum power of the internal combustion engine.

It is self-evident here that the electric machine of the first drive unit is preferably also used at least predominantly as the sole drive source in a speed range below the first speed threshold value. This is because, in such speed ranges, it is frequently necessary for the vehicle to be accelerated or braked, wherein, in said speed range, acceleration power can be provided with considerably greater efficiency by the electric machine than by the internal combustion engine.

Furthermore, in said speed range, the braking power can be at least predominantly provided by the electric machine in a generator mode, such that, in said speed range, an electrical energy store is not only briefly discharged (during accelerations) but is also recharged (during braking).

In other words, in said lower speed range, the energy imparted for acceleration can be at least partially recovered again, such that the energy store is not discharged at all or is discharged only relatively little, even if the motor vehicle is operated in the lower speed range for a relatively long period of time.

In the case of the above-mentioned aspects of the method according to the invention, it is preferable for the first and/or the second drive unit to be controlled such that, in a first operating mode during travel, said first and/or second drive unit provides a level of motor drive power that corresponds to a positive gradient resistance.

For example, if the vehicle, proceeding from steady-state operation, undergoes a transition from travelling on a flat road to travelling on a rising gradient, it is preferable for the drive power required for this purpose (which corresponds to the respective gradient resistance) to be provided by the second drive unit. Depending on the state of charge of the electrical energy store, it may however also be desired or advantageous for said drive power to be provided by the first drive unit or in a hybrid drive mode.

Said method is implemented in particular in the speed range above the first speed threshold value.

It is correspondingly preferable for the first drive unit to have an electric machine and for the first drive unit to be controlled such that, in a first operating mode during travel, said first drive unit provides a level of generator power that corresponds to at least a part of a negative gradient resistance.

In this situation, when the vehicle is travelling "downhill", it is possible, in order to maintain the same speed, for the electric machine to be operated in the generator mode in order to compensate for the negative gradient resistance.

The above-described aspects of methods according to the invention relate to a first operating mode in which drive power is automatically provided either by the first drive unit and/or by the second drive unit. The basic idea consists in using the internal combustion engine substantially in an upper speed range in order to overcome the rolling and air resistance (and if appropriate the gradient resistance), and satisfying dynamic driving demands by means of the electric machine.

In a further preferred variant of the above-described aspects of methods according to the invention, the first drive unit has an electric machine, wherein the second drive unit has an internal combustion engine, and wherein, in a second operating mode, the drivetrain is controlled such that drive power and/or braking power are provided only by the first drive unit.

In this purely electric driving mode, the internal combustion engine is shut down, and travelling power is imparted by the electric machine exclusively via the associated first gearbox arrangement. If a further clutch is provided which can decouple the internal combustion engine, it is also possible for the second gearbox arrangement to be used in this operating mode.

The second operating mode is preferably an operating mode below a first speed threshold value.

In a further preferred embodiment of the above-mentioned aspects of methods according to the invention, the first drive unit has an electric machine, wherein the second drive unit has an internal combustion engine, and wherein, in a third operating mode, the drivetrain is controlled such that drive power is provided by the first drive unit and by the second drive unit and such that braking power is provided by the first drive unit in a generator mode.

In this "hybrid mode" for the provision of drive power, the drive powers of the first and of the second drive unit can be substantially combined, such that the driver experiences driving operation associated with a more powerful electric machine. In other words, in this third operating mode, the internal combustion engine can be used for "boosting" the electric machine when positive drive power is demanded. Negative drive power is in any case preferably provided by the electric machine, because this can be used for charging the electrical energy store, wherein it is preferable for the internal combustion engine in this case to be decoupled by means of the second gearbox arrangement.

If the first or the second gearbox arrangement has multiple gear stages, it is possible in all of the methods specified above, in the event of gearshifts in one gearbox arrangement, for traction-power-assisting or supporting drive power to be provided via the other drive branch, such that comfortable driving operation substantially without interruptions in traction power can be achieved in virtually all operating modes.

According to a further preferred aspect of a method according to the invention, the first drive unit has an electric machine, wherein the second drive unit has an internal combustion engine, and wherein, in at least one operating mode of normal operation of the drivetrain during travel, the drivetrain is controlled such that, below a second threshold value of the speed of the motor vehicle, the second drive unit is shut down and only the first drive unit provides drive power.

In this case, the second threshold value may be identical to the first threshold value, though may also be lower than the first threshold value.

According to a further aspect of a method according to the invention, the first drive unit has an electric machine, wherein the second drive unit has an internal combustion engine, wherein the drivetrain can be switched between normal operation with at least one operating mode and auxiliary operation, wherein the switch to auxiliary operation is performed as a function of a state of charge of an electrical energy store of the drivetrain, and wherein, in auxiliary operation, only the second drive unit provides drive power.

For most driving profiles, it is possible for an electrical energy store to be kept in an at least partially charged state during driving operation. In a few exceptional cases, a situation may arise in which the electrical energy store has a state of charge below a predetermined charge threshold value, such that it is no longer desirable for further drive power to be provided by means of the electric machine.

In this case, auxiliary operation is established, in which drive power is provided only by means of the internal combustion engine. In said auxiliary operation, it may be the case, in particular if the internal combustion engine has considerably lower power than the electric machine, that the driving performance available to the driver will be considerably less dynamic, which will likewise be indicated to the driver if appropriate. In other words, in such auxiliary operation, the driver will assume that he presently cannot perform any dynamic acceleration manoeuvres.

In all variants of the methods mentioned above, it is preferable if drive power is provided both by the electric machine and also by the internal combustion engine for starting processes of the motor vehicle, wherein, in this case, the clutch is closed.

Furthermore, in all variants, it is preferable for the internal combustion engine to be able to utilize all of the gear stages which are available in the gearbox arrangements, wherein the electric machine can generally utilize only the gear stages of the associated first gearbox arrangement, at least if no further clutch is provided.

Furthermore, in all variants, it is preferable for the gradations and transmission ratios of the gearbox arrangements to be selected such that the vehicle can be moved over the entire speed range, that is to say from starting up to maximum speed, by means of only the first drive unit or by means of only the second drive unit.

In a preferred variant, the internal combustion engine is connected directly to the associated second gearbox arrangement. In this case, the electric machine can provide the necessary wheel torque during shift processes, such that relatively long shift times in the second gearbox arrangement can be realized.

It is particularly preferable for the electric machine to be utilized for providing acceleration power, whereas the rolling resistance, the air resistance and, if appropriate, the gradient resistance are overcome preferably by means of the operation of the second drive unit in the form of an internal combustion engine.

In all of the variants described above, it is advantageous for electric propulsion even without the use of the internal combustion engine to consequently be possible beyond a travelling range that is greater than the purely electric travelling range. This means that, in particular in the first operating mode, the battery is preserved through the use of the internal combustion engine in steady-state operation. In this way, in the case of a driving profile involving initially urban traffic, then motorway driving and then urban traffic again, it can be ensured that purely electric driving is possible (preferably below the first speed threshold value $v_S$) even in the urban traffic at the destination.

The drive concept according to the invention is a type of range extender concept but with only one electric machine without an additional generator.

In particular in the first operating mode, in which the internal combustion engine is used substantially in an upper speed range in order to overcome the rolling and air resistance, an electrical energy store can be charged using the following strategy:

It is firstly provided that the internal combustion engine reacts inertly to positive or negative accelerations. Accordingly, follow-up adjustment of the internal combustion engine with regard to its load point must be repeatedly performed in order to adapt to the new driving situation, in particular the new running resistances. In the event of a decrease of the running resistances, excess drive power is available which can be used for charging the battery (of the electrical energy store).

It is also possible, during steady-state operation, for the load point of the internal combustion engine to be shifted, ideally in the direction of an optimum operating point of the internal combustion engine (at which the latter operates with improved efficiency). The excess drive power provided in this way can hereby be used for charging the battery.

Such a continuous raising of the load point can firstly be performed in order for the internal combustion engine to be operated in an improved efficiency range. Secondly, it is hereby possible for a so-called zero-torque regulation regime to be deactivated.

In the case of a zero-torque regulation regime, the electric machine is controlled such that it does not impart a negative torque even if the rotor is set in rotation. In this way, it is for example possible for so-called "coasting" operation to be established.

The power losses that arise here may be in the range of a few kW, in particular at high speeds. In this case, the internal combustion engine can shift its load point so as to additionally impart said power in order for said power to be used for recuperation (that is to say for charging the electrical drive store).

In this case, it may be preferable for said deactivation of the zero-torque regulation regime to be implemented only when the state of charge of the electrical energy store falls below a threshold value, for example 40 to 50% of the maximum state of charge.

Each of the above aspects and variants of methods according to the invention can be conducted either with a hybrid drive train as mentioned in the introduction, or with a hybrid drive train according to any of the aspects of the present invention. It is self-evident that the features mentioned above and the features yet to be explained below can be used not only in the respectively specified combination but also in other combinations or individually without departing from the scope of the present invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
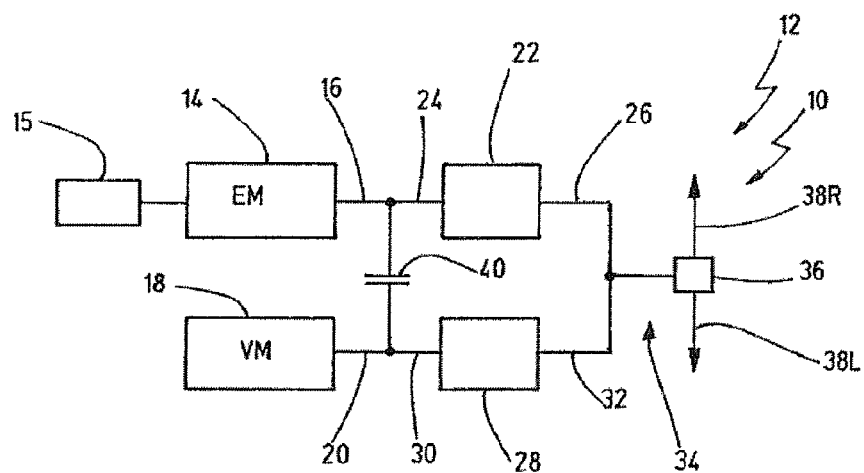
FIG. 1 is a schematic illustration of a first embodiment of a hybrid drivetrain according to the invention.

In FIG. 1, a first embodiment of a drivetrain according to the invention is illustrated in schematic form and is denoted generally by 10. The drivetrain 10 serves for the drive of a motor vehicle 12 and has a first drive unit 14 with an electric machine EM. The electric machine 14 is connected, if appropriate via suitable power electronics, to an electrical energy store 15. The electric machine 14 can be operated both as an electric motor and also as a generator. The first drive unit 14 has a first drive device 16, which may for example be in the form of a shaft or a shaft/gear set arrangement.

Furthermore, the drivetrain 10 has a second drive unit 18 in the form of an internal combustion engine VM which has a second drive device 20, which is generally in the form of a crankshaft.

The drivetrain 10 also comprises a first gearbox arrangement 22 which has a first gearbox input 24 and a first gearbox output 26. Furthermore, the drivetrain 10 comprises a second gearbox arrangement 28 which has a second gearbox input 30 and a second gearbox output 32. The gearbox outputs 26, 32 are connected to one another and are connected to a drive output device 34 which has, for example, a mechanical differential 36 by means of which drive power can be distributed between driven wheels 38L, 38R of the motor vehicle 12.

The first drive device 16 is preferably fixedly connected to the first gearbox input 24. Furthermore, the second drive device 20 is preferably fixedly connected to the second gearbox input 30.

Consequently, drive power can be provided via two parallel power strands, firstly via the first drive unit 14 and the first gearbox arrangement 22, and secondly via the second drive unit 18 and the second gearbox arrangement 28.

The first gearbox arrangement 22 preferably has at least one selectable gear stage in the form of a starting gear stage, though may also have two selectable gear stages. The second gearbox arrangement 28 preferably has at least one, in particular two selectable gear stages. A reverse gear stage may additionally be implemented in the first gearbox arrangement 22 if appropriate.

The drivetrain 10 also comprises a clutch 40 which connects the first gearbox input 24 and the second gearbox input 30 to one another. The clutch 40 may be in the form of a jaw clutch, a synchromesh shift clutch or a friction clutch.

When the clutch 40 is open, the drivetrain 10 can establish driving operation purely under electric motor power by means of the first drive unit 14, or driving operation purely under internal combustion engine power by means of the second drive unit 18.

Since the electric machine EM of the first drive unit 14 can be switched into an idle state in which the rotor is substantially freely movable, it is possible, with the clutch 40 closed, for internal combustion engine drive power from the first drive unit 14 to also be applied to the first gearbox input 24 via the clutch 40, such that, during operation under internal combustion engine power, gear stages of the first gearbox arrangement 22 can also be used. In general, it is indeed also possible for electric motor drive power to be conducted to the second gearbox input 30 via the closed clutch 40. Here, however, it is generally the case that the internal combustion engine is also driven along, which impairs efficiency, such that this approach is not preferred. It is however possible for the internal combustion engine VM to be connected via a further clutch to the second gearbox input 30, though this is not illustrated in FIG. 1. In this case, it is possible for the internal combustion engine VM to be decoupled, such that even during operation under electric motor power, all of the gear stages of the first and second gearbox arrangements 22, 28 can be used.

Below, a description will be given of further embodiments of drivetrains according to the invention, which generally correspond in terms of construction and mode of operation to the drivetrain of FIG. 1. Identical elements are therefore denoted by the same reference signs. Substantially the differences will be explained below.

FIG. 1 shows a preferred embodiment in which a crankshaft 42 of the internal combustion engine (VKM=VM) is fixedly connected to an inner shaft 44 arranged coaxially with respect thereto, which inner shaft forms a second gearbox input 30. A hollow shaft 46 is rotatably mounted coaxially with respect to the inner shaft 44, which hollow shaft is connected to the rotor of the electric machine EM which is likewise arranged coaxially with respect hereto. The hollow shaft 46 forms a first drive device 16 and is fixedly connected to a hollow shaft which forms the first gearbox input 24. The hollow shaft 46 can be connected to the inner shaft 44 via the clutch 40.

Provided in parallel with respect to the hollow/inner shaft arrangement 44, 46 is a common output shaft 48 which forms a common first and second gearbox output 26, 32.

In the present case, the first gearbox arrangement 22 has two selectable gear stages 1, 3 which can be engaged and disengaged by means of associated synchromesh shift clutches S1, S3. The shift clutches S1, S3 are integrated into a shift clutch pack, which also makes a neutral position possible.

Provided axially adjacent hereto is the second gearbox arrangement 28, which likewise has two gear stages 2, 4 which can be engaged and disengaged by means of associated shift clutches S2, S4. The shift clutches S2, S4 are likewise integrated into a shift clutch pack, which likewise makes a neutral position possible.

The shift clutches of all of the gear stages are, in the present case, arranged on the common output shaft 48. The gear stages 1 to 4 are formed in each case by a gear set arrangement, which gear set arrangements have a loose gear rotatably mounted on the output shaft 48 and have a respectively associated fixed gear connected to the respective shaft 42 or 44.

The clutch 40 is arranged preferably between the first drive unit 14 and the second drive unit 18 in the axial direction. The common output shaft 48 is connectable to a drive output device 34 (not illustrated in any more detail).

The drivetrain 10 of FIG. 2 will be explained below on the basis of a diagram of drive power versus vehicle speed, denoted by 52 in FIG. 3, and a table 54 in FIG. 4.

Figure 3:
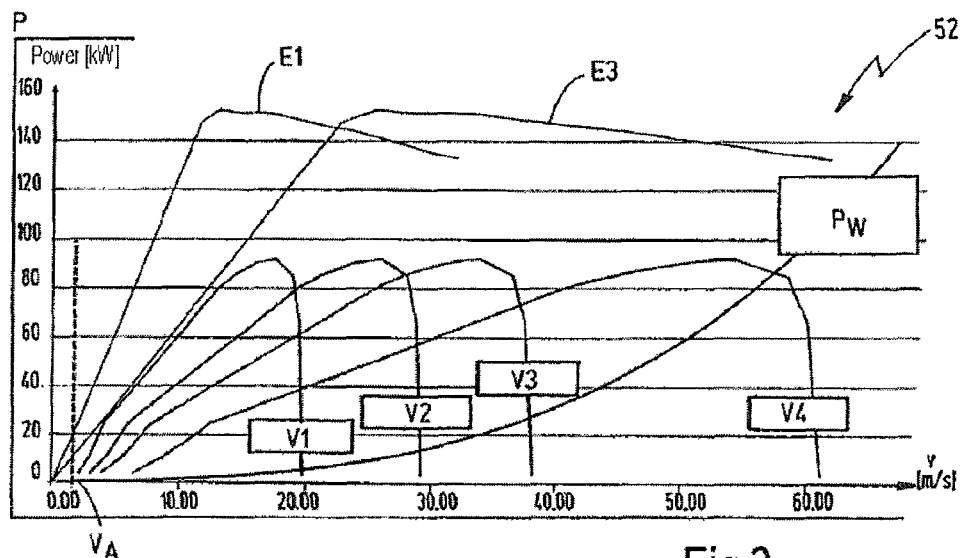
FIG. 3 is a diagram of power versus speed, with an illustration of the powers that can be provided at the driven wheels by the internal combustion engine and by the electric machine in the case of the drivetrain of FIG. 2.

FIG. 3 shows that operation under internal combustion engine power can be established in all four gear stages 1 to 4, wherein the speed ranges that can be established in said gear stages, and achievable powers at the driven wheels, are illustrated by respective power curves V1 to V4. The four gear stages 1 to 4 of the two gearbox arrangements 22, 28 in this case exhibit similar gradation to conventional motor vehicle gearboxes of spur-gear type of construction. In other words, a maximum speed of 20 m/s can be established in the first gear stage, a maximum speed of approximately 28 m/s can be established in the second gear stage, a maximum speed of approximately 38 m/s can be established in the third gear stage, and the theoretical maximum speed in operation under internal combustion engine power (approximately 62 m/s) can be established in the fourth gear stage.

Also shown in FIG. 3 is the resistance power $P_W$, which is determined by the running resistance. Said power $P_W$ is a function of the running resistance $F_W$, which is defined as follows:

$$F_W = F_R + F_S + F_A + F_L,$$

where $F_R$ is the rolling resistance, $F_S$ is the gradient resistance, $F_A$ is the acceleration resistance and $F_L$ is the air resistance. The rolling resistance is a function of the mass of the vehicle and the gradient (gradient of the roadway on which the vehicle is travelling). The gradient resistance is likewise a function of mass and gradient. The acceleration resistance is a function of the mass and acceleration. The air resistance is a function of the square of the travelling speed v.

Said running resistance yields a resistance curve such as is known per se, which has for example a parabolic form. The resistance curve also yields that, for the resistance curve shown, the maximum speed in operation under internal combustion engine power is approximately 56 m/s, because it is there that the theoretical drive power in the fourth gear stage is equal to the power corresponding to the running resistance at said speed.

Figure 2:
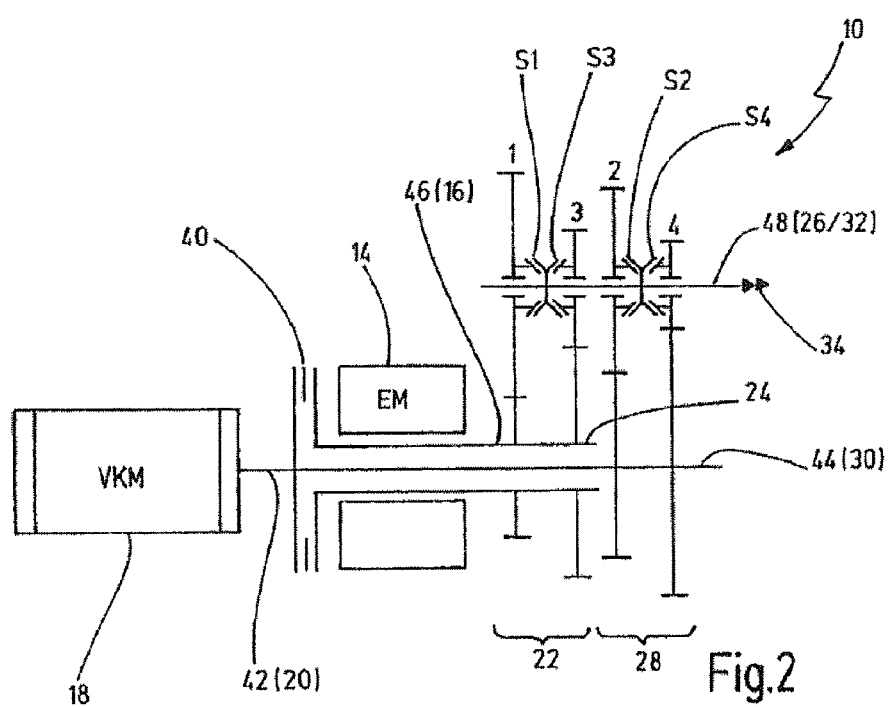
FIG. 2 is a schematic illustration of a further embodiment of a hybrid drivetrain according to the invention.

The drivetrain 10 of FIG. 2 can also be operated purely under electric motor power. Here, the gear stages 1 and 3 can be used. The corresponding maximum power curves E1 and E2 are likewise illustrated in FIG. 3. It can be seen that, in the present case, the electric machine EM has a considerably higher power than the internal combustion engine. The maximum power may for example be greater than 1.5 times the maximum power of the internal combustion engine, though is preferably considerably higher still.

It can also be seen from this that, at the above-described maximum speed in operation under internal combustion engine power, there is still an adequate excess of power available from the electric machine, such that the electric machine could drive the vehicle at an even higher speed.

Figure 4:
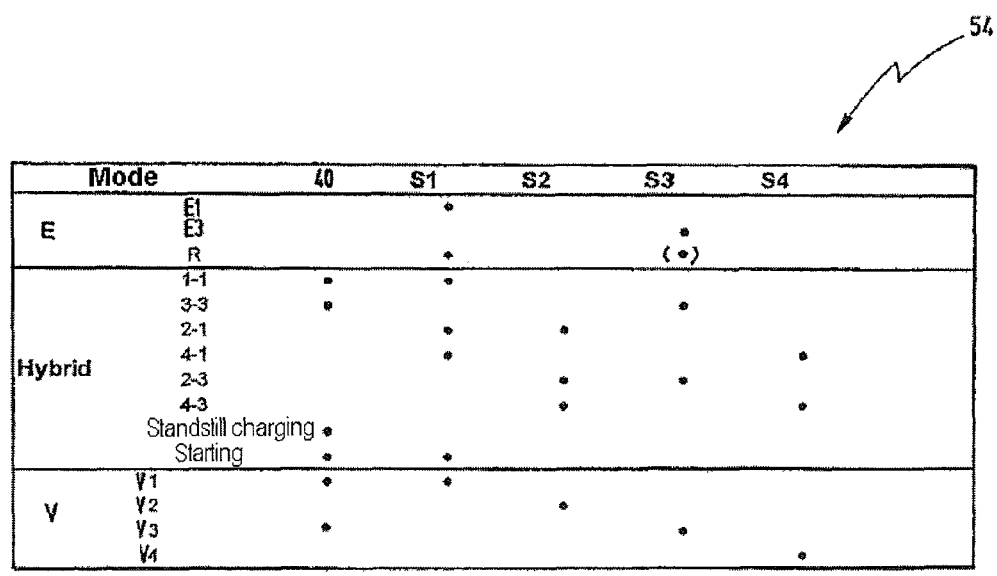
FIG. 4 shows a shift table for the drivetrain of FIG. 2.

The different operating modes are presented in FIG. 4. In the operating mode E1, the shift clutch S1 is closed. In the operating mode under electric motor power E3, the shift clutch S3 is closed. In the reverse travel mode, the shift clutch S1 (or the shift clutch S3) is closed. In all of said modes, the shift clutches S2 and S4 are open, and the internal combustion engine VM is preferably shut down. Furthermore, the clutch 40 is open in all of said operating modes.

The four operating modes under internal combustion engine power are presented in the lower part of the table of FIG. 4 as V1 to V4. When the first gear stage is used, the clutch 40 is closed and the shift clutch S1 is closed, and the other shift clutches are open. Correspondingly, when the third gear stage is used, the clutch 40 is closed and the shift clutch S3 is closed, and the other shift clutches are open.

In each of the operating modes V2 and V4, the clutch 40 is open, and the shift clutch S2 or the shift clutch S4, respectively, is closed.

The middle part of the table 54 of FIG. 4 describes the various hybrid modes. In these, drive power is provided in each case by the electric machine EM and by the internal combustion engine VM.

It is shown here that, for starting, it is preferable for the clutch 40 to be closed and for the first gear stage to be engaged by means of the shift clutch S1, wherein drive power is provided both by the electric machine EM and also by the internal combustion engine VM. The same clutch state is established for the hybrid mode 1-1.

Correspondingly, a hybrid mode 3-3 can be established in which the clutch 40 is closed and the shift clutch S3 is closed, in order for drive power both from the electric motor and also from the internal combustion engine to be transmitted via the third gear stage.

So-called standstill charging is also possible, in which all of the shift clutches are open and the clutch 40 is closed. Here, the internal combustion engine VM is driven in order to operate the electric machine EM in a generator (recuperative) mode.

In all of the other hybrid drive modes, the clutch 40 is open, wherein one gear stage is engaged in each of the gearbox arrangements 22, 28; for example, in the hybrid mode 2-1, the gear stage 2 is engaged in the second gearbox arrangement 28 and the gear stage 1 is engaged in the first gearbox arrangement 22.

It can be seen that all combinations are possible, because the curves E1, E3 and V1 to V4 of FIG. 3 all overlap in the horizontal direction.

Figure 5:
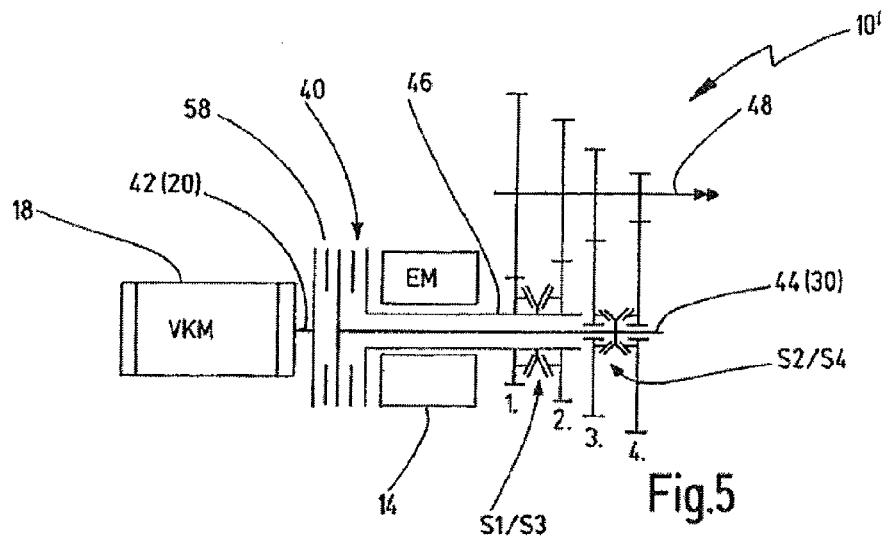
FIG. 5 shows a modification of the drivetrain of FIG. 2.

FIG. 5 illustrates a further embodiment of a drivetrain 10' which corresponds in terms of construction and mode of operation to the drivetrain 10 of FIG. 2. Identical elements are therefore denoted by the same reference signs. Substantially the differences will be explained below.

Accordingly, the drivetrain 10' of FIG. 5 has a further clutch 58 which connects the second drive device 20 to, or separates the latter from, the second gearbox input 30.

In this embodiment, the further clutch 58 is preferably integrated with the clutch 40 as a type of dual clutch, and is likewise arranged between the first drive unit 14 and the second drive unit 18 in the axial direction.

All of the operating modes of FIG. 4 can be established with the drivetrain 10' of FIG. 5. In this case, in all situations in which the clutch 40 is closed, the further clutch 58 should likewise be closed.

However, with the drivetrain 10' of FIG. 5, it is also possible for an electric operating mode E2 and an electric operating mode E4 to be established, in which the further clutch 58 is open and drive power from the electric motor is conducted via the second gearbox arrangement 28. In this way, the electric machine EM can utilize four gear stages for drive purposes.

Furthermore, in the embodiment of FIG. 5, in a modification of the embodiment of FIG. 2, the loose gears of the gear stage gear sets and the associated shift clutches S1 to S4 are arranged on the hollow shaft 46 and on the inner shaft 44, and the common output shaft 48 is connected to associated fixed gears.

Figure 6:
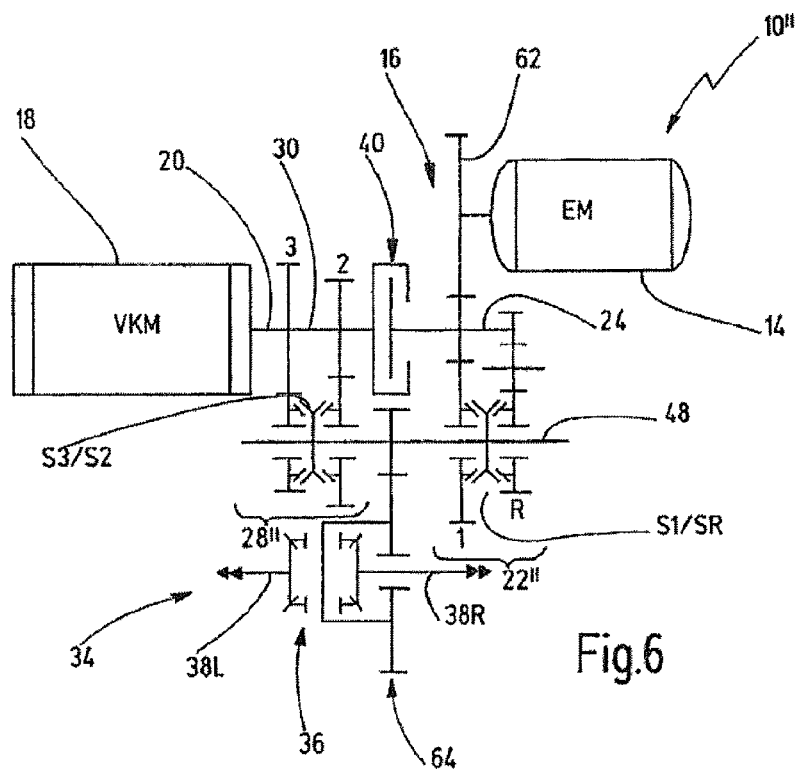
FIG. 6 shows a schematic illustration of a further embodiment of a drivetrain according to the invention.

A further embodiment of a drivetrain according to the invention is denoted, in FIG. 6, by 10". This embodiment, too, generally corresponds in terms of construction and mode of operation to the drivetrain 10 of FIGS. 1 and 2. Consequently, identical elements are denoted by the same reference signs. Substantially the differences will be explained below.

In the drivetrain 10" of FIG. 6, the electric machine EM of the first drive unit 14 is arranged parallel and offset with respect to the second drive unit 28. A motor shaft of the electric machine EM is connected to a drive gear 62 which meshes with a gear (in this case a fixed gear) of the gear set of a gear stage of the first gearbox arrangement 22". In this way, the electric machine EM can be operated at high rotational speeds, such that it can generally be of compact form.

Furthermore, in the embodiment of FIG. 6, the first gearbox arrangement 22" and the second gearbox arrangement 28" are arranged on axially opposite sides of the clutch 40, wherein a shaft that forms the first gearbox input 24 and a shaft which forms the second gearbox input 30 are oriented coaxially with respect to one another. The crankshaft 42 of the internal combustion engine VM and the motor shaft of the electric machine EM point toward one another in the axial direction. Gear sets for the forward gear stages are arranged between the internal combustion engine VM and the electric machine EM in the axial direction.

In the case of the drivetrain 10", the drive output device 34 comprises a drive output gear set 64 which is aligned with the clutch 40 in the axial direction and which has a gear connected to an input element of the differential 36.

The drivetrain 10" of FIG. 6 is configured in particular for front-transverse installation in a motor vehicle. The differential 36 and the gearbox arrangements 22", 28" are preferably integrated in a common gearbox housing, which is not illustrated in FIG. 6.

In the present case, the first gearbox arrangement 22" has a gear set for the gear stage 1. Furthermore, the first gearbox arrangement 22" has a gear set for a reverse gear stage R. Correspondingly, the first gearbox arrangement 22" comprises a shift clutch S1 for the gear stage 1 and a shift clutch SR for the reverse gear stage R.

In the present case, the second gearbox arrangement 28" has two gear stages 2, 3, which can be engaged and disengaged by means of corresponding gear sets with shift clutches S3/S2.

Figures 7, 8:
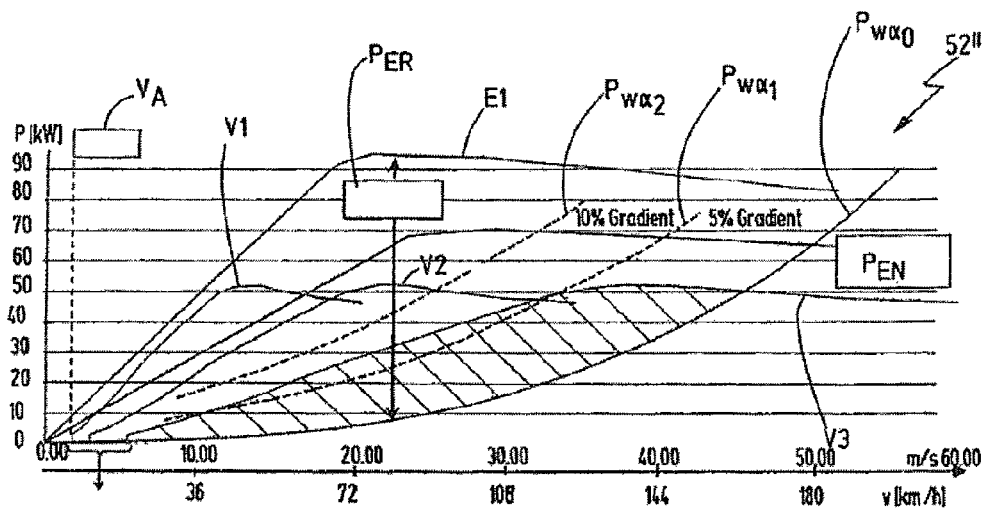
FIG. 7 shows a diagram of power versus speed, with an illustration of the powers that can be provided at the driven wheels by the internal combustion engine and by the electric machine in the case of the drivetrain of FIG. 6.
FIG. 8 shows a shift table for the drivetrain of FIG. 6.

FIG. 7 shows a diagram 52" of power versus speed for the drivetrain 10", wherein the diagram is of similar basic layout to the diagram 52 of FIG. 3. Correspondingly, FIG. 8 shows a shift table 54" for the drivetrain 10" of FIG. 6, wherein the table 54" is of generally similar layout to the table 54 of FIG. 4.

Therefore, only the differences will be explained below.

On the one hand, in the purely electric drive mode, only a single forward travel stage can be established, specifically by means of the gear stage 1. Accordingly, in FIG. 7, there is only one power curve E1 for driving operation under electric motor power, in which the shift clutch S1 is engaged and the clutch 40 is open.

However, reverse travel operation can also be established under electric motor power, specifically by means of the reverse gear stage R, with the shift clutch SR closed.

Correspondingly, owing to the presence of the gear set for the reverse gear stage R, it is also possible in operation under internal combustion engine power for a reverse operating mode VR to be established, in which the clutch 40 is closed and the shift clutch SR is closed.

Under internal combustion engine power, three operating modes can be established correspondingly to the three gear stages, which are designated as V1, V2 and V3 in FIG. 7 and FIG. 8.

Correspondingly to the table of FIG. 4, it is likewise possible for hybrid modes to be established, which are shown in the middle part of the table 54" of FIG. 8. Said hybrid modes include not only parallel hybrid operating modes for forward travel but also hybrid operating modes for reverse travel.

Starting is preferably likewise performed by means of the gear set of the gear stage 1, wherein both internal combustion engine power and electric motor power are provided, that is to say the clutch 40 is closed.

Furthermore, standstill charging is also possible, in which all of the shift clutches are open and the clutch 40 is closed.

In the drivetrain 10", it is generally also possible for a further clutch 40 to be provided, as denoted by 58 in FIG. 5. Said further clutch would, in that embodiment, connect the second drive device 20 to the second gearbox input 30, wherein a further clutch of said type to be integrated with the clutch 40, similarly to the embodiment of FIG. 5 in terms of construction.

FIG. 7 illustrates, by way of E1, the maximum power that can be provided by means of the electric machine EM at the respective speed. Furthermore, FIG. 7 also shows a curve depicting the rated power of the electric machine EM. The point of intersection of said curve $P_{EN}$ with the resistance curve $P_W$ yields in each case the maximum top speed in continuous operation. FIG. 7 also illustrates resistance curves for a gradient of 0% ($P_{W\alpha 0}$) and two further resistance curves with gradients of 5% and 10% respectively ($P_{W\alpha 1}$, $P_{W\alpha 2}$).

FIG. 7 also schematically shows, by way of $P_{ER}$, the electric reserve power, represented as the difference between the resistance curve and the maximum power curve E1. This is referred to as a reserve because, as will be described below, during operation, the steady-state resistance power, which is based on the rolling resistance and the air resistance and, if appropriate, the gradient resistance, is covered by the internal combustion engine VM.

FIGS. 3 and 7 also each show a speed threshold $v_A$ which may be for example 7 or 8 km/h. Said threshold indicates the speed above which the clutch 40 should be closed during operation under internal combustion engine power.

Figure 9:
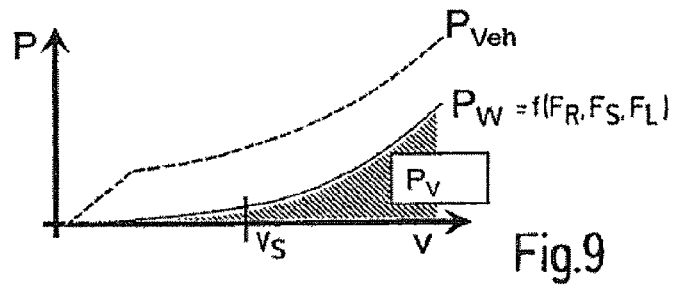
FIG. 9 shows a diagram of power versus speed, with an illustration of the available vehicle power and the resistance power to be overcome.

FIG. 9 likewise shows a schematic diagram of power versus speed, wherein it is shown that, at least above a speed threshold value $V_S$, the internal combustion engine VM provides a drive power $P_V$ which, at the respective speed v, corresponds to the steady-state running resistance (resistance curve $P_W$) which is determined from the rolling resistance, the gradient resistance and the air resistance ($F_R$, $F_S$, $F_L$).

In this operating mode, only the power required for acceleration (the acceleration resistance $F_B$ to be overcome) is covered by the electric machine EM. It can be seen in FIG. 9 that the power $P_{VEH}$ (=$P_V$) that can be provided by the drivetrain 10 is in this case generally greater than the power arising from the running resistance.

Figure 10:
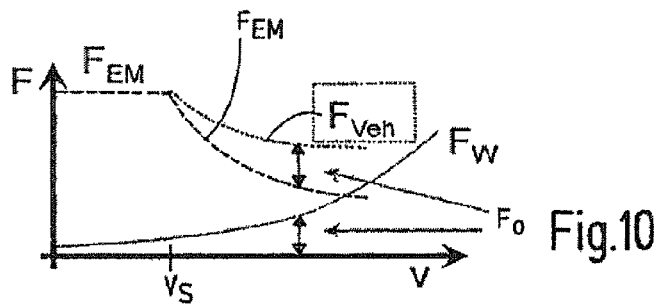
FIG. 10 is an illustration, similar to FIG. 9, of running resistance and drive power versus speed, in order to illustrate different operating modes of the above-mentioned drivetrains.
Figure 11:
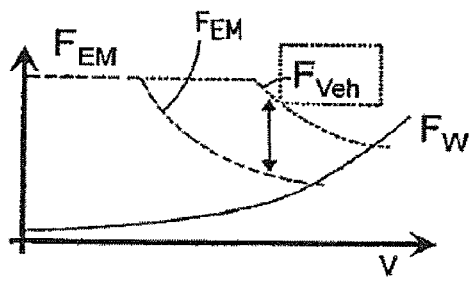
FIG. 11 is an illustration, similar to FIG. 10, for explaining a further operating mode of the above-described drivetrains.

FIG. 10 and FIG. 11 each show diagrams of force versus speed, in which diagrams the running resistances $F_W$ are plotted. Also illustrated is the drive force $F_{EM}$ that can be provided by the electric machine EM. In the illustration of FIG. 10, it is shown that, above a threshold value $V_S$, it is possible, on the one hand, for a maximum power to be realized which is obtained by addition of the force $F_{EM}$ of the electric machine EM and of an offset force $F_O$ which is provided by the internal combustion engine VM. Said offset force $F_O$ is however generally utilized for overcoming the running resistance $F_W$, as is likewise illustrated in FIG. 10.

FIG. 11 shows a diagram corresponding to FIG. 10, showing an operating mode in which both the electric machine EM and also the internal combustion engine VM are used for providing drive, which leads to an overall force $F_{VEH}$.

Figure 12:
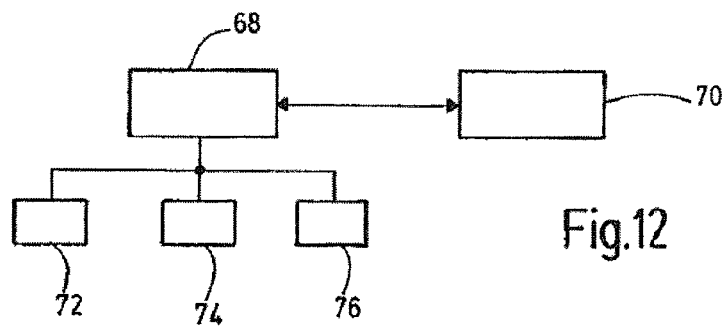
FIG. 12 shows a schematic block diagram of operating states of the above-described drivetrains.

FIG. 12 schematically shows different operating modes that can be established by the drivetrains described above.

A so-called normal operating mode is illustrated at 68, which normal operating mode can be switched to an auxiliary operating mode 70 as a function of a state of charge of the electrical energy store 15.

In the auxiliary operating mode 70, the drivetrain 10 is operated exclusively under internal combustion engine power, specifically when the state of charge of the electrical energy store 15 falls below a certain threshold value.

By contrast, in the normal operating state 68, it is to be assumed that the electrical energy store 15 is adequately charged, such that both internal combustion engine power and also electric motor power can be drawn upon.

In normal operation 68, three different operating modes 72, 74, 76 can be established. A first operating mode 72 is a so-called auto mode, in which the strategy described above is implemented, whereby, above a speed threshold $v_S$, the internal combustion engine VM is used substantially for overcoming the rolling resistance, the air resistance and, if appropriate, the gradient resistance. In the event of positive acceleration demands, the electric machine EM is used to satisfy these, or, in the event of negative acceleration demands (braking), the electric machine is switched into the generator state. Furthermore, in the first operating mode 72, it is provided that, in a speed range below the first threshold value $v_S$, the electric machine EM is used as the sole drive source, and the internal combustion engine VM is shut down (and the clutch 40 is opened).

The second operating mode 74 is an operating mode in which the drivetrain 10 is operated exclusively by means of the electric machine EM, with the internal combustion engine VM being shut down.

Finally, the third operating mode 76 is a hybrid drive mode in which drive power is provided by the first and by the second drive unit 14, 18, such that it is possible in each case for maximum dynamics to be achieved, that is to say the internal combustion engine VM is used to "top up" the power curve of the electric machine EM, as schematically illustrated in FIG. 11.

It is preferable for the first or the second operating mode 72, 74 to be selected manually by the driver of the motor vehicle. Since the driver generally knows his destination and thus the target distance, the driver may for example intentionally select the second, purely electric operating mode 74 if he wishes to use the vehicle only over a short distance. It is preferably also provided that, upon starting of the motor vehicle, the first operating mode 72 is always selected as standard, with it being possible for the second operating mode 74 to be selected manually proceeding from said first operating mode.

The third operating mode may likewise be manually selected, in the manner of a "sport mode". Furthermore, it is preferable for the third operating mode to be automatically selectable proceeding from the first and/or from the second operating mode if the driver makes a particularly high power demand, which can be detected for example by means of a kickdown switch which is assigned to the accelerator pedal. In this way, it is for example possible for a higher drive torque to briefly be provided even proceeding from the electric operating mode (for example for roadway sections with positive gradients).

The invention claimed is:
1. Hybrid drivetrain for a motor vehicle, having:
 a first drive unit which has a first drive device by means of which first drive power can be provided;
 a second drive unit which has a second drive device by means of which second drive power can be provided;

a drive output device which can be connected to driven wheels of the motor vehicle;

a first gearbox arrangement which has a first gearbox input and a first gearbox output;

a second gearbox arrangement which has a second gearbox input and a second gearbox output;

wherein the first drive device is connected to the first gearbox input and wherein the second drive device is connected to the second gearbox input;

wherein the first and the second gearbox output are connected to the drive output device;

wherein the first and second gearbox inputs can be connected to one another or separated from one another by means of a clutch;

wherein the clutch is arranged in an axial direction between the first drive device and the second drive device; and wherein the drivetrain has an electrical energy store for an electric machine, the capacity of the electrical energy store is less than 20 kWh.

2. Drivetrain according to claim 1, wherein the first gearbox arrangement has at least one first selectable gear stage.

3. Drivetrain according to claim 2, wherein the first selectable gear stage constitutes a starting gear stage of the drivetrain.

4. Drivetrain according to claim 1, wherein the first gearbox arrangement has a reverse gear stage.

5. Drivetrain according to claim 1, wherein the second gearbox arrangement has at least two selectable gear stages.

6. Drivetrain according to claim 1, wherein the transmission ratio or transmission ratios that can be established by the first gearbox arrangement and the transmission ratio or transmission ratios that can be established by the second gearbox arrangement are different.

7. Drivetrain according to claim 1, wherein the first drive unit has precisely one electric machine, wherein the second drive unit has an internal combustion engine and no electric machine.

8. Drivetrain according to claim 1, wherein the first drive unit has an electric machine which has a first maximum power, wherein the second drive unit has an internal combustion engine which has a second maximum power, wherein the first maximum power is greater than the second maximum power.

9. Drivetrain according to claim 1, wherein the second drive device is fixedly connected to the second gearbox input.

10. Drivetrain according to claim 1, wherein the second drive device is connected to the second gearbox input via a further clutch.

11. Drivetrain according to claim 1, wherein the first gearbox input is a hollow shaft, wherein the second gearbox input is an inner shaft which extends through the hollow shaft.

12. Hybrid drivetrain for a motor vehicle, having:
a first drive unit which has a first drive device by means of which first drive power can be provided;
a second drive unit which has a second drive device by means of which second drive power can be provided;
a drive output device which can be connected to driven wheels of the motor vehicle;
a first gearbox arrangement which has a first gearbox input and a first gearbox output;
a second gearbox arrangement which has a second gearbox input and a second gearbox output;
wherein the first drive device is connected to the first gearbox input and wherein the second drive device is connected to the second gearbox input by means of a clutch;
wherein the clutch is arranged in axial direction between the first drive device and the second drive device;
wherein the first and the second gearbox output are connected to the drive output device;
wherein the first drive unit has an electric machine which has a first maximum power, wherein the second drive unit has an internal combustion engine which has a second maximum power, wherein the first maximum power is greater than the second maximum power; and
wherein the drivetrain has an electrical energy store for the electric machine, the capacity of the electrical energy store is less than 20 kWh.

13. Drivetrain according to claim 12, wherein the first gearbox input is a hollow shaft, wherein the second gearbox input is an inner shaft which extends through the hollow shaft.

14. Drivetrain according to claim 12, wherein the first drive device has a drive gear.

15. Drivetrain according to claim 12, wherein the first gearbox output and the second gearbox output have a common output shaft.

16. Method for controlling a hybrid drivetrain for a motor vehicle, having:
a first drive unit which has a first drive device by means of which first drive power can be provided;
a second drive unit which has a second drive device by means of which second drive power can be provided;
a drive output device which can be connected to driven wheels of the motor vehicle;
a first gearbox arrangement which has a first gearbox input and a first gearbox output;
a second gearbox arrangement which has a second gearbox input and a second gearbox output;
wherein the first drive device is connected to the first gearbox input and wherein the second drive device is connected to the second gearbox input; and
wherein the first and the second gearbox output are connected to the drive output device;
having the following steps: controlling the second drive unit, in a first operating mode during travel, such that, at least above a first threshold value of the speed of the motor vehicle, the second drive unit provides a level of drive power that corresponds to the rolling resistance of the vehicle and the air resistance of the vehicle at the respective speed.

17. Method according to claim 16, wherein the first drive unit has an electric machine, having the following steps: controlling the first drive unit, in the first operating mode during travel, such that, above the first threshold value of the speed of the motor vehicle, the first drive unit at least one of provides a level of motor drive power required for a demanded positive acceleration, and, in a generator mode, at least a part of a level of braking power required for a demanded negative acceleration.

18. Method according to claim 16, wherein at least one of the first and the second drive unit is controlled such that, in the first operating mode during travel, said drive unit provides a level of motor drive power that corresponds to a positive gradient resistance.

19. Method according to claim 16, wherein the first drive unit has an electric machine and wherein the first drive unit is controlled such that, in the first operating mode during travel, said first drive unit provides a level of generator power that corresponds to at least a part of a negative gradient resistance.

20. Method according to claim 16, wherein the first drive unit has an electric machine, wherein the second drive unit has an internal combustion engine, and wherein, in a second operating mode, the drivetrain is controlled such that at least one of drive power and braking power are provided only by the first drive unit.

21. Method according to claim 16, wherein the first drive unit has an electric machine, wherein the second drive unit has an internal combustion engine, and wherein, in a third operating mode different from the first and a second operating mode, the drivetrain is controlled such that drive power is provided by the first drive unit and by the second drive unit and such that braking power is provided by the first drive unit in a generator mode.

22. Method according to claim 16, wherein the first drive unit has an electric machine, wherein the second drive unit has an internal combustion engine, and wherein, in at least one operating mode of normal operation of the drivetrain during travel, the drivetrain is controlled such that, below a second threshold value of the speed of the motor vehicle, the second drive unit is shut down and only the first drive unit provides drive power.

23. Method according to claim 16, wherein the first drive unit has an electric machine, wherein the second drive unit has an internal combustion engine, wherein the drivetrain can be switched between normal operation with at least one operating mode and auxiliary operation, wherein the switch to auxiliary operation is performed as a function of a state of charge of an electrical energy store of the drivetrain, and wherein, in auxiliary operation, only the second drive unit provides drive power.

* * * * *